(12) United States Patent
Dalton (10) Patent No.: US 6,238,818 B1
(45) Date of Patent: May 29, 2001

(54) IN-LINE DRY CELL CARTRIDGE OR HOUSING

(75) Inventor: David R. Dalton, North Turramurra (AU)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/338,073

(22) Filed: Jun. 23, 1999

(51) Int. Cl.[7] .............................. H01M 2/10; H01M 2/00
(52) U.S. Cl. ................... 429/96; 429/97; 429/98; 429/99; 429/100; 429/148; 429/149; 429/152; 429/153; 429/154; 429/155; 429/156; 429/157; 429/159; 429/163; 429/164; 429/176; 429/9
(58) Field of Search ........................ 429/9, 96, 97, 429/98, 99, 100, 148, 149, 152, 153, 154, 155, 156, 157, 159, 163, 164, 176, 1

(56) References Cited

U.S. PATENT DOCUMENTS

| | | |
|---|---|---|
| 4,265,984 * | 5/1981 | Kaye .................................. 429/178 |
| 4,530,034 | 7/1985 | Kawarada . |
| 4,576,880 | 3/1986 | Verdier et al. . |
| 4,595,641 * | 6/1986 | Giurtino ................................. 429/1 |
| 4,737,420 | 4/1988 | Ikeda et al. . |
| 5,061,579 * | 10/1991 | Ishimoto .............................. 429/96 |
| 5,607,322 * | 3/1997 | Schaub .............................. 439/500 |
| 5,631,098 * | 5/1997 | Suzuki .................................. 429/1 |

* cited by examiner

Primary Examiner—Carol Chaney
Assistant Examiner—Angela J. Martin
(74) Attorney, Agent, or Firm—Robert W. Welsh (57) ABSTRACT

The invention relates to a housing which receives dry cells in an in-line or end to end orientation. The invention includes features which prevent the incorrect orientation by preventing dry cell terminals making contact with the necessary components. In this way, it prevents premature dissipation of dry cells or their impairment. The mechanism by which these features do this is to recess one terminal namely that terminal which would be contacted by the positive terminal of a dry cell. In this way, the negative terminal of a dry cell can never make electrical connection. Another feature of the invention is the provision of an aperture having a profile of a silhouette of a dry cell, which has advantages in low light situations, saves material, and allows for relatively easy extraction of dry cells from the cartridge.

28 Claims, 5 Drawing Sheets

IN-LINE DRY CELL CARTRIDGE OR HOUSING

CROSS-REFERENCE TO RELATED APPLICATIONS

This application claims priority under 35 U.S.C. §120 on PCT Application No. PCT/AU97/00877 filed on Dec. 23, 1997, which claims priority under 35 U.S.C. §119(d) on Australian Patent No. 76519/96, filed on Dec. 24, 1996, the disclosures of which are incorporated by reference herein.

BACKGROUND OF THE INVENTION

The present invention relates to cartridges or housings which receive dry cells in an in-line orientation and are subsequently inserted into appliances, such as flashlights, which utilize those dry cells.

Generally dry cell powered appliances have cavities which receive dry cells. These cavities have covers associated with them and the covers may generally have a sticker adhered to them which indicates the orientation in which the dry cells should be positioned. Alternatively, the cavities or the covers are embossed to indicate the orientation. However, the orientation that dry cells are ultimately installed in is dictated by the person installing the dry cells, and because they generally do not check the correct orientation from the diagram provided, the process will generally rely on that person remembering the correct orientation. The difficulty with this is that if dry cells are placed in the wrong orientation, then there is a chance that some dry cells will be dissipated or may become incapable of providing current. This could occur even while an appliance is switched off. Also, the appliance may have polarity sensitive circuits which might be damaged by incorrect polarity.

It is an object of the present invention to provide a housing or cartridge which ameliorates, at least in part at least one of the disadvantages of the prior art.

SUMMARY OF THE INVENTION

The invention provides a housing having a generally elongate body to hold at least two dry cells together in series connection in an end to end or in-line orientation, said housing being insertable into and removable from an appliance, and includes: a first end having a first end wall which will receive a positive terminal of a dry cell and a second end having a second end wall; said first end wall and said second end wall each having a passage therethrough to allow electrical contact to be made by terminals of an appliance with terminals of a dry cell at said first and second ends; two or more dry cell cavities which each have at least one side wall and further having an intermediate wall common to adjacent cavities, the or each intermediate wall cooperating with a contact member which electrically connects the positive of one dry cell with the negative of an adjacent dry cell when dry cells are placed in correct orientation in adjacent cavities; said intermediate walls have or include a portion having a predetermined thickness and an axial passage therethrough, said thickness being less than the length of a raised cylindrical positive terminal of a dry cell, said intermediate walls having a first surface facing in the direction of said second end and a second surface facing in the direction of said first end; the or each said intermediate wall and said contact member being arranged so that a side of said contact member facing said second end is recessed relative to said first surface, so that a raised cylindrical positive terminal of a dry cell must pass, at least partially, through said passage to make electrical contact with said contact member.

Preferably said passage through said second end wall cooperates with the surface of a negative terminal of a dry cell in the cavity at said second end, so that when correctly positioned in said cavity, the surface of said negative terminal is recessed from the outwardly facing surface of said second end wall.

Preferably the thickness of said second end wall and a portion of said intermediate wall or said intermediate wall determines the depth of recessing.

Preferably said intermediate walls are each constructed from two wall parts with a space between each wall part to receive said contact member, so that a surface or a portion of a surface of said contact member is recessed from said first surface by the thickness of said wall part which includes said first surface.

Preferably said contact member is held in each intermediate wall by the joining of each wall part together at one end, to enclose the space between the wall parts.

Preferably said housing has a generally semi-cylindrical body in which said dry cell cavities are formed.

Preferably said holding members are extensions of said body which partially enclose a volume to form and occlude said cavities.

Preferably said body includes an aperture to provide some resilient flexibility to assist said holding members to move, to allow placement and removal of said dry cells.

Preferably said contact members include a bias means associated with the contact member to engage a negative terminal of a dry cell.

Preferably said aperture has the profile similar to the silhouette of a dry cell with a representation of a positive terminal being visible.

Preferably the contact member includes at least one angled barb which engages one of the facing wall parts of said end wall, said barb being angled to prevent removal of the contact member once it has been positioned in the end wall.

Preferably said passage through said end intermediate wall and said first and second end walls is of a generally U-shaped, or semi circular or part semi circular construction.

Preferably said first end wall is semi-circular.

Preferably said intermediate walls have a generally circular periphery.

Preferably said passage through intermediate walls is of a substantially U-shaped construction.

Preferably said intermediate wall is made from a single wall part and has said contact member attached to said second surface, so as to recess said contact member from said first surface.

Preferably the housing includes holding members cooperating with said side walls, said holding members being moveable to allow insertion or removal of a dry cell into or out of said cavities, The invention also provides an appliance powered by dry cells which are serially connected and mounted in a housing as described in any one of the above paragraphs, wherein the positive terminal of said appliance is constructed so that it has at least one projection associated with it which can engage an external surface of said second end wall of said housing as described in any one of the above paragraphs, so as to prevent said positive terminal of said appliance making contact with the negative terminal of a dry cell in a cavity associated with the second end wall of said housing.

Preferably said at least one projection also engages an external surface of said first end wall so as to prevent said positive terminal of said appliance making contact with the negative terminal of an incorrectly positioned dry cell in a dry cell cavity associated with said first end wall of said housing.

The invention further provides a housing being insertable into, and removable from, an appliance, said housing holding to more than two dry cells in an in-line or end to end orientation, said housing including a series of dry cell cavities to receive said dry cells, said cavities including a body portion having at least one side wall portion, said housing including a part of said body associated with each cavity having a shaped aperture therethrough which has a profile similar to a silhouette of a dry cell with a part of the aperture representing the positive end of a dry cell, said part of said aperture and said aperture being oriented so as to correspond to and indicate the correct orientation of the dry cell in said cavity, said aperture being of a size which will prevent said dry cell passing through said aperture.

Preferably said housing is generally cylindrical.

Preferably said shaped aperture cooperates with said holding means to assist said holding means to be moveable to allow removal or insertion of said dry cells out of or into said cavity.

Preferably said housing includes a holding means to releaseably hold said dry cells in said cavity.

Preferably said aperture assists in the removal of a dry cell from said cavity.

The invention also provides an appliance in combination with a housing as described in any one of the above paragraphs, wherein said appliance has a housing receiving cavity to receive said housing, said appliance including a positive and negative terminal for electrical connection to first and second ends of said housing, said housing including intermediate walls having a thickness or depth of a dimension so that the overall length of said housing is greater than the length of the same number of said dry cells, which said housing is meant to receive, when said same number of dry cells are series connected from end to end, said housing receiving cavity being of a dimension such that if said number of dry cells are placed in said housing receiving cavity without said housing, the positive and negative terminal of said appliance are sufficiently spaced that no simultaneous electrical connection can be made between all of said dry cells and said positive and negative terminals.

Embodiments of the invention for the housing have features which ensure that dry cells inserted in an incorrect orientation in the cavity will have the negative end of the dry cell not in contact with the contact member between adjacent cavities. Thus any impairment of the dry cell to perform as required will not occur.

Further, the presence of a shaped aperture to indicate the orientation of the dry cell in the cavity, provides several advantages namely: a more reliable method of identification in low light situations; a means to reduce the amount of force required to open the holding members; and a means to simultaneously reduce the amount of plastic in the housing or cartridge.

Also, an appliance having the features discussed above in paragraphs 19 to 21, has a relatively simple means to protect the circuits of the appliance, to prevent the incorrect installation into the appliance of a housing containing dry cells in correct orientation in the housing.

Finally the appliance and housing in combination prevent the appliance being used without the housing thereby forcing a user to install all dry cells in the correct orientation by having to use the housing, otherwise no operation of the appliance will occur, without interfering with the dry cell arrangement.

BRIEF DESCRIPTION OF THE DRAWINGS

An embodiment of the present invention will now be described, by way of example only, with reference to the accompanying drawings, in which.

DETAILED DESCRIPTION OF THE EMBODIMENTS

Figure 1:
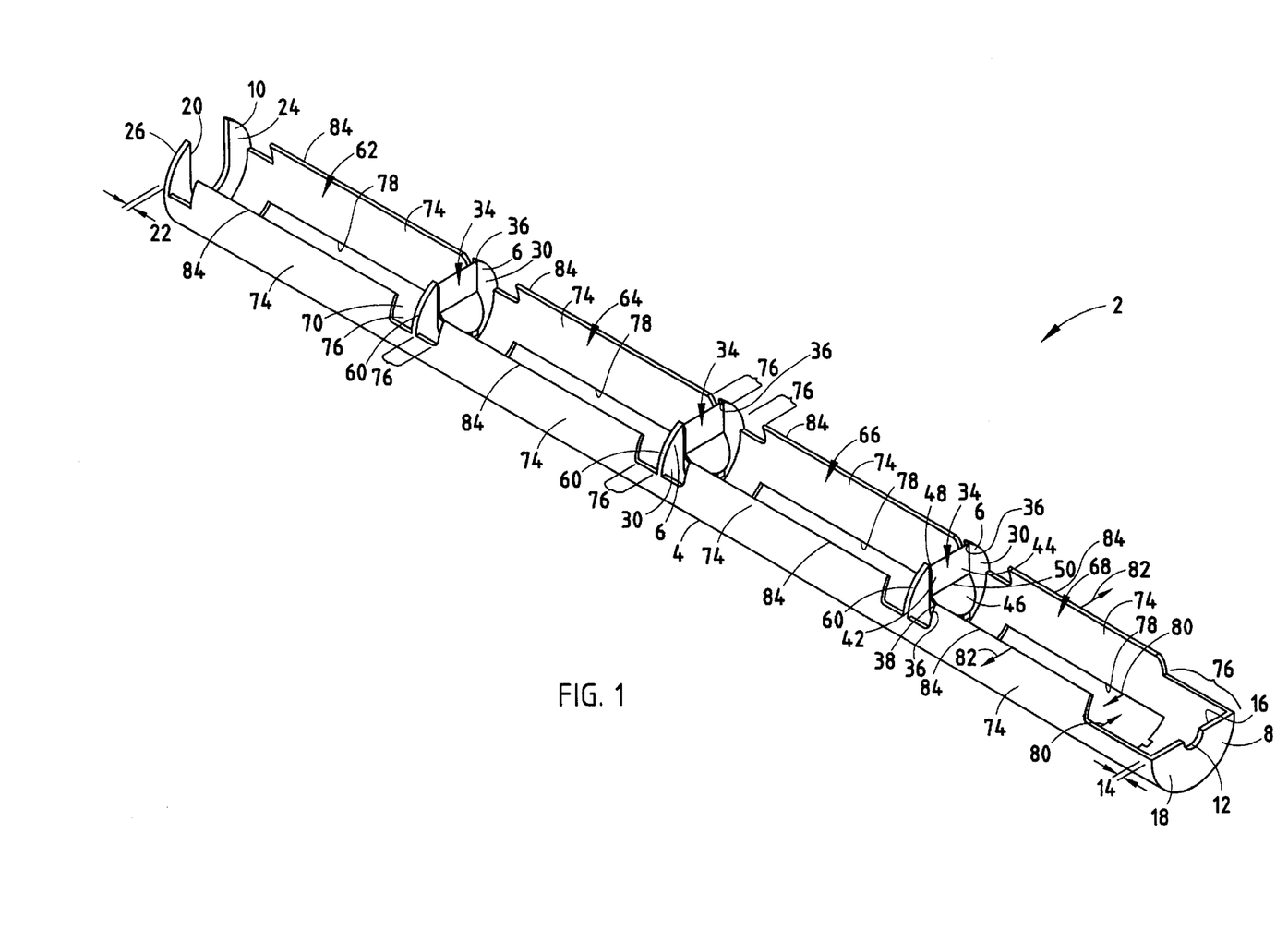
FIG. 1 is a perspective view of a dry cell housing.

Illustrated in FIG. 1 is a housing 2 which includes a body portion 4. The housing 2 is meant to receive four dry cells in an in-line or end to end orientation, so that when they are correctly installed they are connected in series. The body portion 4 illustrated in FIG. 1 has a generally semi-cylindrical shape because this embodiment is required to be inserted into a cylindrical cavity in an appliance. The shape of the body 4 can be manufactured to conform to any shape as desired to be received by a matching cavity in an appliance. For example the shape could be square or triangular.

Body 4 has three intermediate walls 6 and first and second end walls 8 and 10, respectively.

Figures 2, 3, 7:
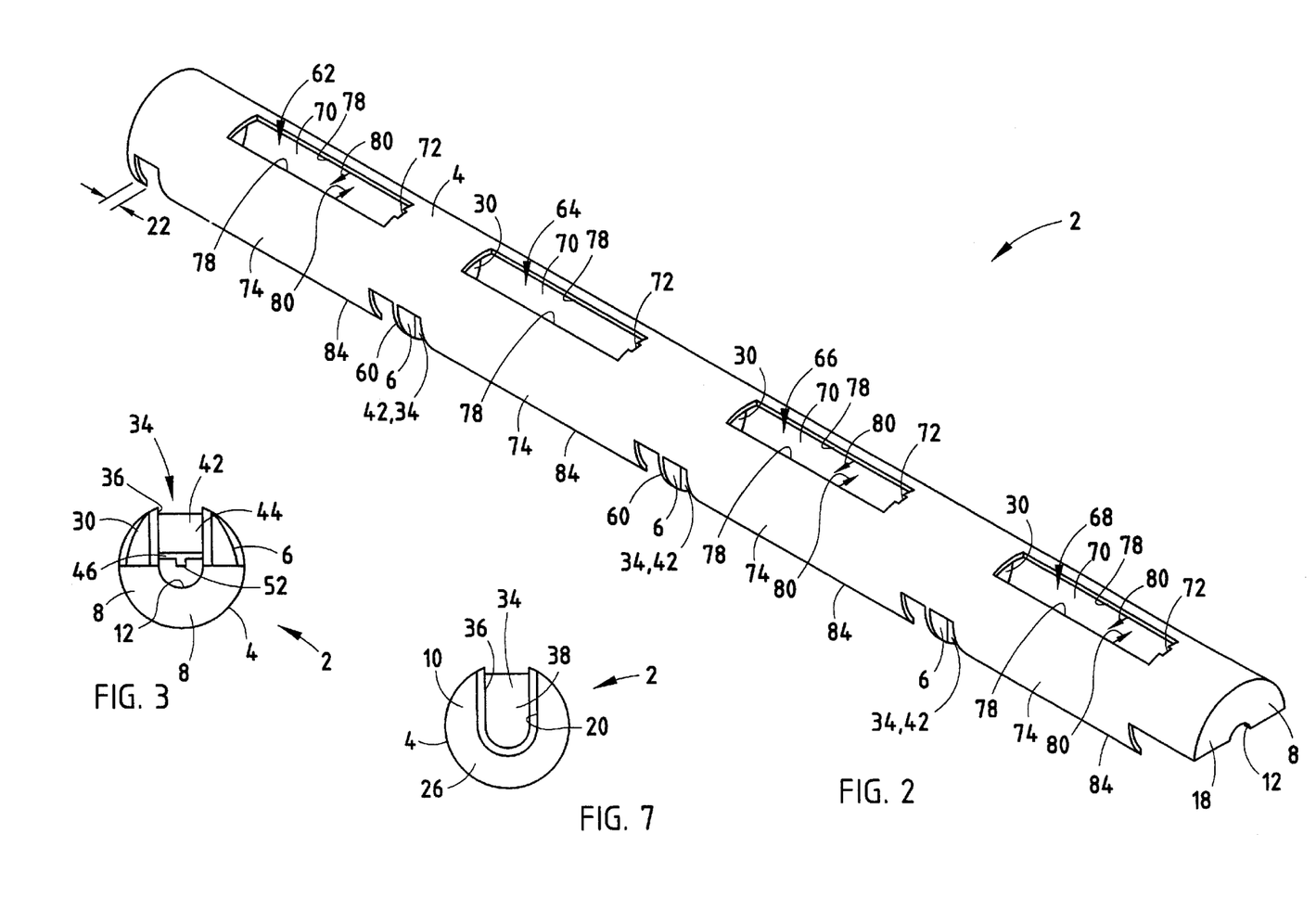
FIG. 2 is an underneath perspective view of the apparatus of FIG. 1.
FIG. 3 is a front view of the apparatus of FIG. 1.
FIG. 7 is a rear view of the apparatus of FIG. 1.
Figure 4:
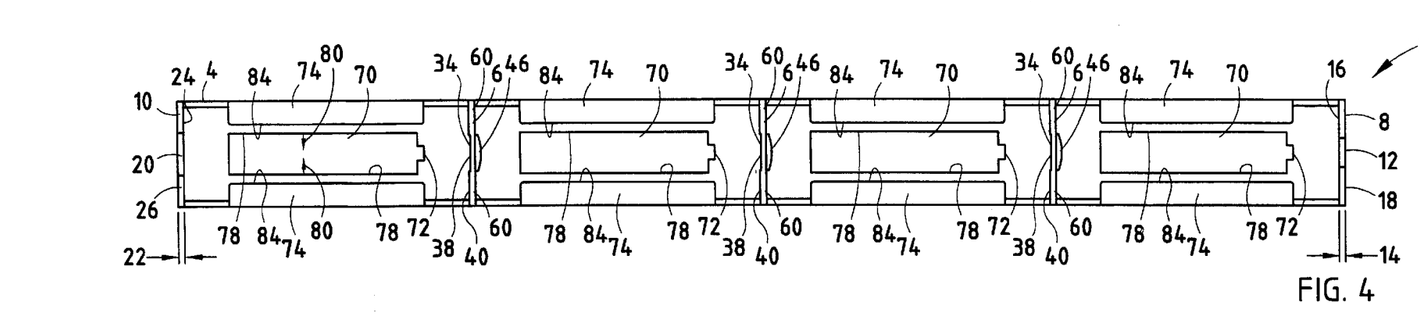
FIG. 4 is a plan view of the apparatus of FIG. 1.
Figure 5:
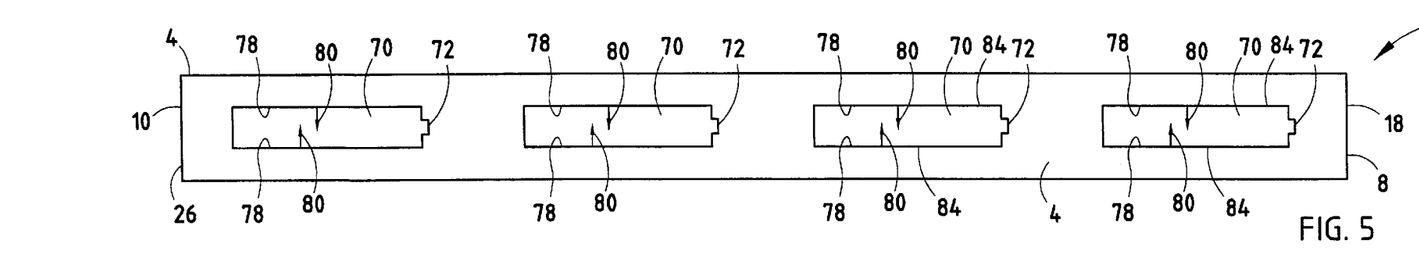
FIG. 5 is an underneath plan view of the apparatus of FIG. 1.
Figure 6:
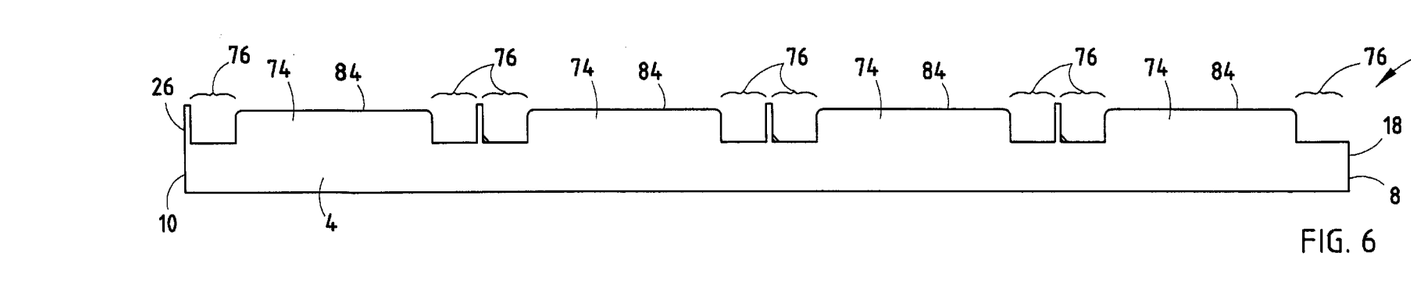
FIG. 6 is a left side view of the apparatus of FIG. 1.

The walls 6, 8 and 10 together with the body 4 form dry cell cavities 62, 64, 66 and 68. The base of each of the dry cell cavities 62, 64, 66, 68 has a generally rectangular aperture 70 which is best illustrated in FIGS. 5, 4 and 2. The aperture 70 has a profile which is similar to a silhouette of a dry cell. The aperture 70, in keeping with the silhouette of a dry cell, has a three sided portion 72 which represents the raised cylindrical positive terminal of a dry cell.

This portion 72 indicates to a user which direction the positive end and positive terminal of a dry cell has to be inserted into a cavity 62, 64, 66, 68. One advantage of the aperture 70 is that if there is any light present, even though that light may not be enough to read by, a user peering through the aperture 70, will be able to determine which direction is correct for the proper installation of a dry cell. This will be more effective in situations of low light than either stickers or even embossed dry cell representations, the latter relying on touch in low light situations.

A second function of each aperture 70 is that it reduces the amount of material in the housing 2, thus saving on material costs. The aperture 70 also serves a third purpose of allowing a dry cell in a respective cavity 62,64, 66, 68 to be pushed out of the cavity by means of the user's finger being pushed partially through the aperture 70. The aperture 70 has a fourth function which will be described later.

The first end wall 8 is at a first end of the housing 2 and is of a generally semi-annular construction with a semi-circular periphery and a semi circular cut-out portion 12 which is positioned so as to receive and locate a centrally mounted raised cylindrical positive terminal of a cylindrical dry cell when such a dry cell is located in cavity 68. The thickness 14 of the first end wall 8 is such that when the circular rim of a dry cell contacts the inner surface 16 of the first end wall 8, the raised cylindrical positive terminal of the dry cell will project past the outwardly facing surface 18 of the wall 8.

The second end wall 10 is located at a second end of the housing 2 and has a generally circular periphery, but has a generally U-shaped form, whereby the "U" defines a straight sided half round periphery of a passage 20, through the central portions of the second end wall. The second end wall 10, if a dry cell is correctly inserted into the cavity 62, will be next adjacent the negative terminal of that dry cell. The second end wall 10 has a thickness 22 which will effectively recess any negative terminal of a dry cell (which contacts the inner surface 24), from the outer surface 26 of the second end wall 10. The depth of the recess will be to the depth of the thickness 22 of wall 10.

The U-shaped passage 20 is of sufficient width to serve the purpose of preventing a dry cell placed in the adjacent cavity 62 from exiting the cavity 62 axially, as well as being of sufficient width so that a biased negative terminal of an appliance, in which the housing 2 will be installed, can make contact with the negative terminal of a dry cell placed in the cavity 62.

Figure 14:
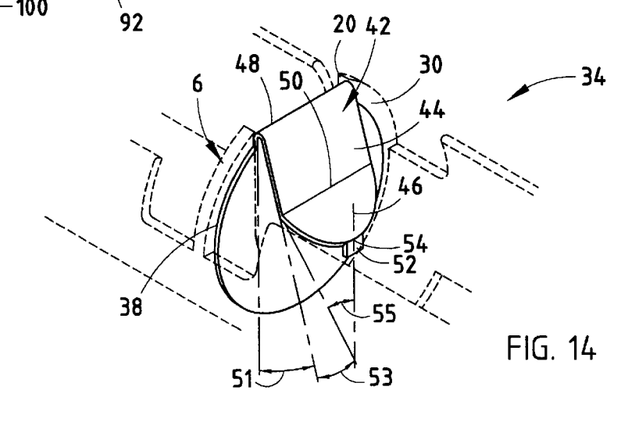
FIG. 14 is a perspective view of a contact member.

The intermediate wall 6 will now be described with reference to FIGS. 1, 9 and 14. Because of congestion most of the reference numbers below are only illustrated in regards to the intermediate wall 6, which is closest to first end wall 8.

The intermediate wall 6 is constructed from two wall parts 28 and 30 which are positioned so as to provide a space 32 between them. Into the space 32 is inserted a contact member 34. The wall parts 28 and 30 have a generally circular periphery and are of a generally U-shaped construction with a passage 36 through them. The passage 36 is defined by the half rounded straight sided generally U-Shaped inner periphery of the wall parts 28 and 30. When the contact member 34 is situated between the wall parts 28 and 30 the contact member 34 is also positioned inside the passage 36.

The contact member 34 has a generally circular and planar first portion 38 which when it is installed between wall parts 28 and 30 remains recessed relative to the first surface 40 of the wall part 28. It remains recessed because the first portion 38 of the contact member 34 is held by the wall parts 28 and 30 in position at the top and bottom and side portions of the contact member 34 and the first portion 38 cannot protrude through. The only part of the contact member 34 not sandwiched by the wall parts 28 and 30 are those portions of the contact member 34 which are exposed in the passage 36.

The portions of contact member 34 exposed in the passage 36 include second portion 42 having a first part 44 which is at an angle to the first portion 38 (before a dry cell is installed). The first part 44 is of a generally rectangular and planar construction and is effectively hinged and biased relative to the first portion 38 by a bend line 48. Because the first part 44 is formed at an angle to the first portion 38, the first part 44 will provide some bias against movement towards the first portion 38.

The second portion 42 also includes a second part 46 which is formed at an angle to the first part 44. The second part 46 is joined to the first part 44 at a bend line 50. The second part 46 is of a generally planar and semi-circular construction of a diameter which is equal to the width of the rectangular first part 44. Extending away from a mid-section of the second part 46 is a tab portion 52. The tab portion 52 is of a generally rectangular and planar construction and is best illustrated in FIG. 14. The tab portion 52 is formed at an angle to the second part 46 and is joined to the circumferential portion of the second part 46 at a bend line 54.

The tab portion 52 cooperates with second part 46 and first part 44 to make good electrical contact with a negative terminal 56 of a dry cell 58 installed in the housing 2. The angular relationship, when first formed, between first part 44, second part 46 and tab portion 52 is as follows (see FIG. 14): the angle 51 that the first part 44 makes to the first portion 38 can range between 2° to 20°; the angle 53 that the second part 46 makes to the first part 44 can range between 2° to 20°; the angle 55 that a tab portion 52 makes to the second part 46 is in the range of 20° to 50° as measured and indicated in FIG. 14.

When a dry cell 58 is installed against the second portion 42, the negative terminal 56 makes contact first with part of the tab portion 52. As the dry cell 58 is further inserted, either the first part 44 rotates towards the first portion 38 and then the second part 46 rotates relative to the first part 44 also toward the first portion 38, or both first part 44 and second part 46 rotate simultaneously. The purpose of the tab portion 52 is to ensure that a surface contact is made between the tab portion 52 and the negative terminal 56 of the dry cell 58. If tab portion were not present only a line contact might be made between the semi circular periphery of second part 46 and the negative terminal 56.

To hold the contact member 34 in position between the wall parts 28 and 30, the two wall parts 28 and 30 are fused so as to produce a fused surface 60. This fused surface 60 extends from the base 4 to the upper extremity of the U-shaped passage 36 to ensure that the contact member will not be removable from the intermediate wall 6 during normal service requirements.

The fused surface 60 is just one preferable method to hold the contact member 34 between the wall parts 28 and 30. Another includes providing the contact member 34 with at least one barb portion (not illustrated), at a region of the contact member 34 which will be adjacent the internal facing surfaces of the wall parts 28 and 30, the barb portion will engage one of the internal surfaces of said wall parts 28 and 30. The barb portion can be angled so that movement is prevented in a direction which would allow the contact member 34 to be removed from the intermediate wall 6. Other methods could include riveting by plastic rivets, riveting by metal rivets which are recessed to prevent electrical contact; use of adhesives or any other appropriate means.

Extending in a circumferential direction from the body portion 4 are a pair of holding members 74 for each cavity 62, 64, 66, 68. The holding members 74 can be generally described as curved extensions of the body 4 and are integrally formed therewith. The curve with which they are formed is the same as that as the circumference of the semi cylindrical body 4.

The holding members 74 do not extend along the whole of the length of the cavities 62, 64, 66, 68. They are generally centrally located along the length of the cavities 62, 64, 66, 68 and are of length to provide equally long spaces 76 at each end and along each side of each cavity 62, 64, 66, 68. These spaces 76 allow a person utilising the housing 2 to remove dry cells from the cavities 62, 64, 66, 68, by permitting a user's fingers to grab the positive or negative end of a dry cell.

The holding members 74 achieve their holding purpose by partially occluding the cavities 62 and 68. The holding members 74 are able to be bent or moved away from their rest position, in which rest position they occlude the openings of the cavities 62, 64, 66, 68. The operation of the holding members 74 and their occlusion of the respective cavity 62, 64, 66, 68 can be best seen in FIGS. 10, 11 and 4.

The holding members 74 are preferred, but are not essential in that the dry cells could beheld by a variety of means if it is desired to hold them in the respective cavities prior to insertion into an appliance. Some other means could include the use of straps or even an outer cylindrical tube to slide over the housing 2, thereby leaving only the positive and negative terminals at respective ends of the housing 2 exposed, and ready for insertion into an appliance.

Whereas, if it is not desired to hold the dry cells in position in the housing prior to insertion in the appliance, then the appliance can include a cylindrical cavity to receive the housing 2. By such a cylindrical cavity in the appliance, the appliance will prevent the dry cells from exiting the cavities 62, 64, 66, 68.

The aperture 70 serves a third purpose in that its presence allows the sides 78 in the central regions of aperture 70 to move in the direction of arrows 80 when each corresponding holding member 74 is moved in the direction of each corresponding arrow 82. Without the aperture 70 being present, a greater force would be required to move the top edges 84 in the directions of arrows 82 to thereby allow a dry cell to be removed.

When a dry cell is being inserted the top edges 84 of holding members 74 will move in a direction of arrows 82 when a cylindrical side wall of a dry cell is placed against the top edges 84 and pressure is applied to the dry cell, so as to insert it into a cavity 62, 64, 66, 68. The top edges 84 will move because of the interaction of the cylindrical dry cell wall and the top edges 84 and the angle between them.

In use, the housing 2 provides the advantage that if any dry cells are placed in an incorrect orientation the dry cell which is incorrectly positioned will not make electrical contact at one end. This will now be described in relation to FIGS. 8 to 11.

Figure 9:
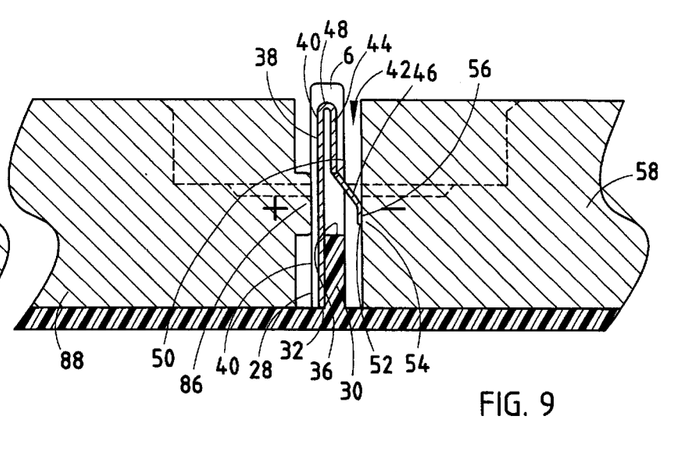
FIG. 9 is a part cross section of the apparatus of FIG. 1 showing two dry cells installed correctly.
Figure 11:
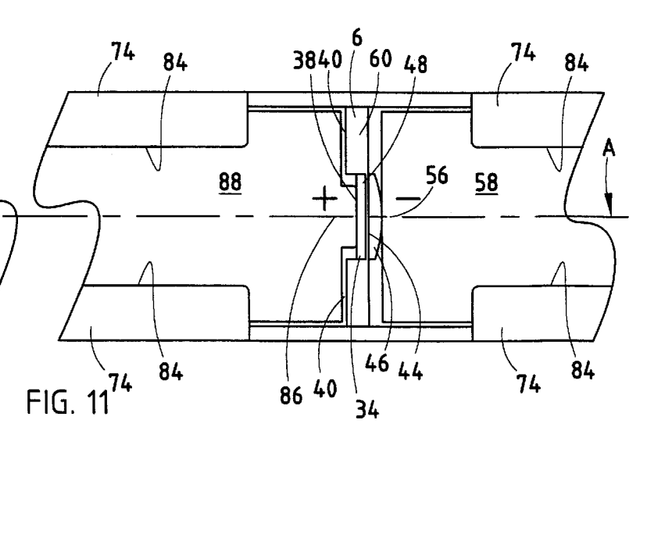
FIG. 11 is a plan view of the apparatus of FIG. 9.

Illustrated in FIG. 9 is a part cross section of two adjacent dry cells 58 and 88 which have been correctly positioned in the housing 2, with a plan view of the arrangement being illustrated in FIG. 11. When in the correct position the raised cylindrical positive terminal 86 of the dry cell 88 partially passes through the U-shaped passage 36 to make electrical contact with the first portion 38 of the contact member 34. The terminal 86 needs to pass through passage 36 because first portion 38 is recessed relative to the external surface 40 of the wall part 28. To form a series connection, another dry cell 58 is placed in the adjacent cavity so that its negative terminal 56 makes contact with the tab portion 52 and second part 46 of the contact member 34, as has been described previously.

Figure 8:
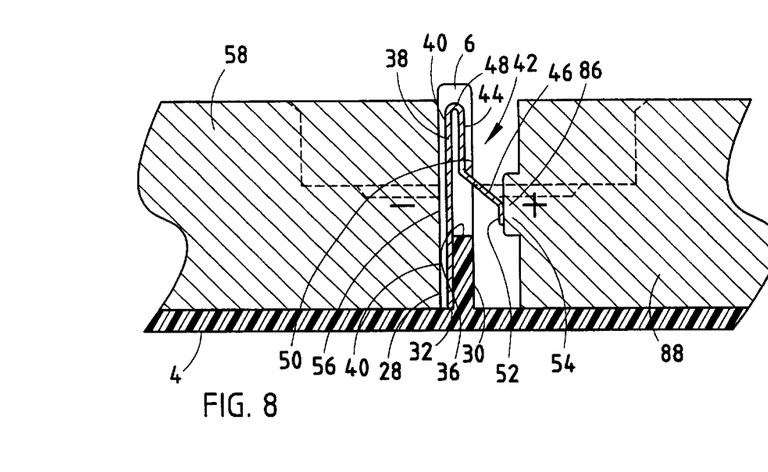
FIG. 8 is a part cross section of the apparatus of FIG. 1 showing two dry cells installed incorrectly.
Figure 10:
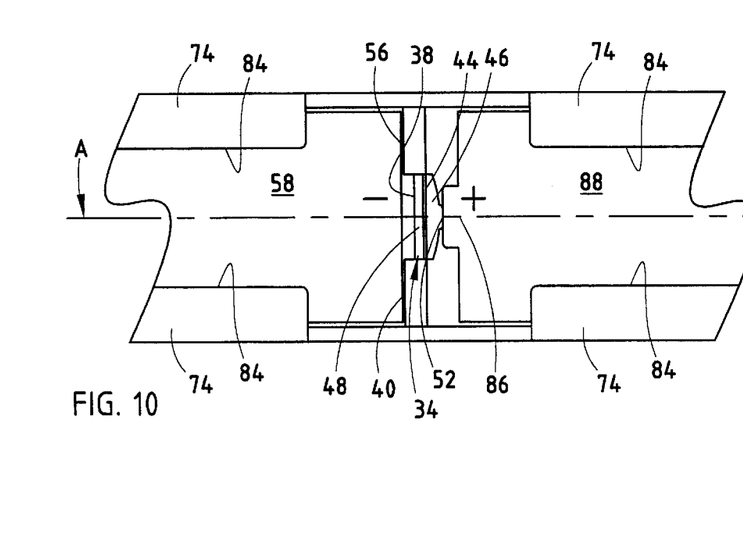
FIG. 10 is a plan view of the apparatus of FIG. 8.

Illustrated in FIG. 8 is a part cross section of two adjacent dry cells 58 and 88 which have been incorrectly positioned in the housing 2, with a plan view of the arrangement being illustrated in FIG. 10. The first portion 38 of contact member 34 is recessed and the external surface 40 of wall part 28 keeps the negative terminal 56 of the dry cell 58 from making contact with the recessed first portion 38, thus no electrical connection is made to the positive terminal 86 of dry cell 88.

Even if only one dry cell in a series of four is placed incorrectly in a cavity, because no contact is made by one negative end of a dry cell with the first portion 38 of a contact member 34 (which is that portion designated for contact with the positive terminal of a dry cell) no dissipation of the stored charge of the dry cells will occur. If however the dry cell 58 in FIG. 8 were placed so that its positive end were making contact with the first portion 38 of contact member 34, then the two positives would be in contact with each other. However still no dissipation of the stored charge from either of the dry cells will occur because one negative terminal of one dry cell is not making electrical connection.

Figure 12:
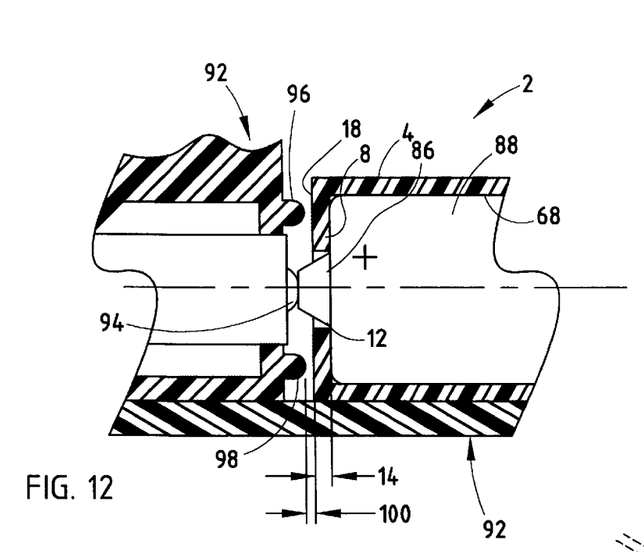
FIG. 12 is a part cross section of an appliance and the front of the housing of FIGS. 1 to 7.

Illustrated in FIG. 12 is a positive terminal end 92 of an appliance, (the rest of which is not illustrated) and an end of housing 2 with a correctly positioned dry cell 88. The positive terminal 86 of dry cell 88 protrudes past the external surface 18 of first end wall 8, so as to make contact with the positive contact 94 of the appliance. The positive terminal 86 and positive contact 94, are pushed together because of bias associated with the negative terminal of the appliance, which pushes against the negative terminal of a dry cell in cavity 62, which in turn pushes the whole housing 2 forward.

Figure 13:
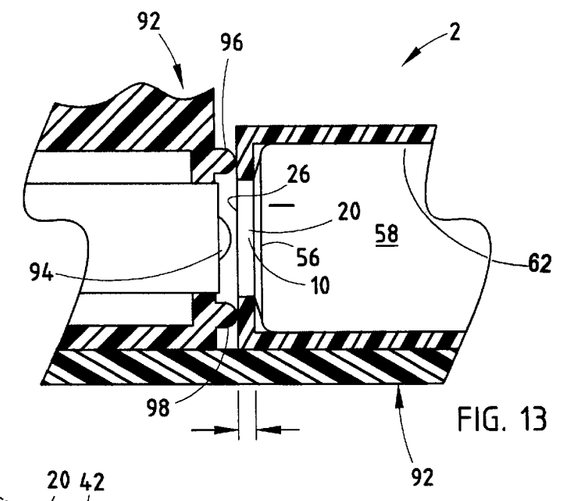
FIG. 13 is a part cross section of an appliance and the rear of the housing of FIGS. 1 to 7.

Around the positive contact 94 are ribs 96 and 98 which are shown in cross section in FIG. 12 (and 13). The ribs 96 and 98 could be replaced by a single rib, such as a U-shaped rib if desired. When the housing 2 is inserted in the correct orientation into the appliance, the ribs 96 and 98 are separated from external surface 18 by a gap 100. In one embodiment, such as that illustrated, the gap 100 is also substantially equivalent to the distance which the positive terminal 86 protrudes past the external surface 18 of the first end wall 8. However, the gap 100 can be reduced or increased depending upon: the thickness of the first end wall 8, distance from the end of positive contact 94 to the end of the ribs 96 and 98.

If desired the positive contact 94 could be spring mounted, in which case the gap 100 might not be present.

Illustrated in FIG. 13 is the positive terminal end 92 of the appliance of FIG. 12, and a correctly positioned dry cell 58 in cavity 62, but the housing 2 has been inserted with its negative end pushed toward the positive contact 94. The second end wall 10 is adjacent the negative end 56 of the dry cell 58 positioned inside the cavity 62. The ribs 96 and 98 engage the external surface 26 of the second end wall 10. Because the surface of the terminal 56 is separated from the surface 26 of second end wall 10 (by the thickness 22 of the second end wall 10) the positive contact 94 does not make electrical contact with the negative terminal 56.

By recessing the end of positive contact 94 from the end of the ribs 96 and 98, there will be even less chance that inappropriate contacts will be made. By recessing the end of positive contact 94 from the end of the ribs 96 and 98, will also prevent contact being made with a positive terminal of a dry cell which is incorrectly positioned in the cavity 62, whereby the positive terminal of the dry cell may be protruding through passage 20 and past the outer surface 26 of end wall 10. However, in this situation such a dry cell in cavity 62 will also not be making electrical contact with a adjacent terminal of an adjacent dry cell in cavity 64, due to the construction of the intermediate wall 6 and the positioning of the surfaces of the contact member 34.

It will be understood that the construction of the intermediate wall 6 ensures that any dry cells incorrectly positioned into any one of cavities 62, 64, 66, 68, will not make electrical contact with an adjacent dry cell and thus no premature dissipation of the dry cells will take place. Further, interaction of the housing 2 at the first end wall 8 and second end wall 10 with the positive terminal end of an appliance ensures that even if all batteries or dry cells are correctly positioned inside each of the cavities 62, 64, 66, 68, if the housing 2 is inserted incorrectly into an appliance, then no circuit is formed with the series connected dry cells, thus providing protection for the appliance.

The number of cavities provided can be varied according to usage. It could vary between 2 to 4, or more, dry cells per housing 2, depending upon the appliance. The housing 2 illustrated in the figures is of dimensions to receive AA-sized dry cells. However, the housing 2 and the cavities 62, 64, 66, 68 can be sized to accept any cylindrical dry cells, having terminals at two ends.

While the above embodiment describes the intermediate wall 6 as having two wall parts 28 & 30, a modified version can be manufactured by using a single wall part 28, with a passage 3 therethrough. In this case the contact member 34 of FIG. 14, by means of the first portion 38, can be riveted by means of a plastic rivet or attached by some other appropriate means, to one side of the wall part 28. In this way, by having first portion 38 on the same side of wall part 28 as illustrated in FIG. 9 (that is the second surface of said intermediate wall 6), and with wall part 30 absent, the alternatively constructed and assembled intermediate wall 6 and contact member 34 will function in the same fashion as the embodiment described above.

Another feature of the housing 2 described above is that the intermediate walls 6 can be increased in size, by such modifications as an increase in the thickness or depth of the wall part 30, together with a commensurate change in shape and or length of the second portion 42 of the contact member 34. By increasing the size of the intermediate walls 6, the overall length of the housing 2 will increase. The length is increased so that it is appropriately longer than the length of the same number of dry cells connected end to end, which are meant to fit into the housing 2. The appliance will have its positive and negative terminals spaced so as to make electrical contact with the dry cell terminals at the ends of the housing 2. If a person were to place dry cells without using a housing 2, into the appliance cavity which would normally receive the housing 2, no simultaneous electrical contact will be made between each adjacent terminal of the dry cells and the positive and negative terminals of the appliance, because of the provision of spacing of the terminals of the appliance. Thereby, the appliance is protected and the chances will be very low of any of the dry cells prematurely dissipating or being impaired and thus not able to provide current as designed. Thus by providing a specially sized housing 2 with the appliance, the user will need to use the housing 2 thereby ensuring that the all the dry cells are correctly oriented for series connection.

While the housing 2 illustrated in the drawings does provide an increase in the overall length of the distance from the positive terminal in the cavity 68 to the negative terminal in the cavity 62, the placing of dry cells into the appliance with a housing as illustrated may still be of sufficient length to make simultaneous contact, because the appliance may provide a negative contact or terminal which can travel a significant distance and is spring biased. Such travel and biasing may make the necessary contact, with the bias being sufficient to complete the contacts of all the dry cells. Thus thicker intermediate walls 6 can be provided to decrease the probability of simultaneous electrical contact of the terminals being made.

The above describes how the correct orientation of the dry cells to be inserted in the cavities is assisted by the apertures 70. However, the correct orientation can be determined readily by feeling the two differently shaped first and second end walls 8 & 10, to identify the positive or first end.

It will be understood that the invention disclosed and defined herein extends to all alternative combinations of two or more of the individual features mentioned or evident from the text or drawings. All of these different combinations constitute various alternative aspects of the invention.

The forgoing describes embodiments of the present invention, and modifications, obvious to those skilled in the art, can be made thereto, without departing from the scope of the present invention.

What is claimed is:

1. A housing for holding dry cells and being insertable into and removable from an appliance, said housing comprising:

a generally elongate body to hold at least two dry cells together in series connection in an end to end or in-line orientation, said elongate body including:

a first end having a first end wall which will receive a positive terminal of a dry cell and a second end having a second end wall, said first end wall and said second end wall each having a passage therethrough to allow electrical contact to be made by terminals of an appliance with terminals of a dry cell at said first and second ends; and at least two dry cell cavities which each have at least one side wall and further having an intermediate wall common to adjacent cavities, each intermediate wall cooperating with a contact member which electrically connects the positive terminal of one dry cell with the negative terminal of an adjacent dry cell when dry cells are placed in correct orientation in adjacent cavities, said intermediate walls have or include a portion having a predetermined thickness and an axial passage therethrough, said thickness being less than the length of a raised cylindrical positive terminal of a dry cell, said intermediate walls having a first surface facing in the direction of said second end and a second surface facing in the direction of said first end, each said intermediate wall and said contact member being arranged so that a side of said contact member facing said second end is recessed relative to said first surface, so that a raised cylindrical positive terminal of a dry cell must pass, at least partially, through said passage to make electrical contact with said contact member.

2. The housing as claimed in claim 1, wherein said passage through said second end wall cooperates with the surface of a negative terminal of a dry cell in the cavity at said second end, so that when correctly positioned in said cavity, the surface of said negative terminal is recessed from an outwardly facing surface of said second end wall.

3. The housing as claimed in claim 2, wherein the thickness of said second end wall and a portion of said intermediate wall or said intermediate wall determines the depth of recessing.

4. The housing as claimed in claim 1, wherein said intermediate walls are each constructed from two wall parts with a space between each wall part to receive said contact member, so that a surface or a portion of a surface of said contact member is recessed from said first surface by the thickness of said wall part which includes said first surface.

5. The housing as claimed in claim 4, wherein said contact member is held in each intermediate wall by the joining of each wall part together at one end, to enclose the space between the wall parts.

6. The housing as claimed in claim 1, wherein said body is a generally semi-cylindrical body in which said dry cell cavities are formed.

7. The housing as claimed in claim 1, wherein said at least one side wall includes holding members a are extensions of said body, said holding members partially enclosing a volume to form and occlude said cavities.

8. The housing as claimed in claim 7, wherein said body includes an aperture to provide some resilient flexibility to assist said holding members in movement, thereby allowing placement and removal of said dry cells.

9. The housing as claimed in claim 1, wherein said contact members include a biased tab portion associated with the contact member to engage a negative terminal of a dry cell.

10. The housing as claimed in claim 8, wherein said aperture has the profile similar to the silhouette of a dry cell with a representation of a positive terminal being visible.

11. The housing as claimed in claim 4, wherein the contact member includes at least one angled barb which engages one of the wall parts of said intermediate wall, said barb being angled to prevent removal of the contact member once it has been positioned in said intermediate wall.

12. The housing as claimed in claim 1, wherein said axial passage through said end intermediate wall and said passages of said first and second end walls are of a generally U-shaped, or semi-circular or part semi-circular construction.

13. The housing as claimed in claim 1, wherein said first end wall is semi-circular.

14. The housing as claimed in claim 1, wherein said intermediate wall has a generally circular periphery.

15. The housing as claimed in claim 1, wherein said passage through said intermediate walls is of a substantially U-shaped construction.

16. The housing as claimed in claim 1, wherein said intermediate wall is made from a single wall part and has said contact member attached to said second surface, so as to recess said contact member from said first surface.

17. The housing as claimed in claim 1 further including holding members cooperating with said side walls, said holding members being moveable to allow insertion or removal of a dry cell into or out of said cavities.

18. An appliance powered by dry cells which are serially connected and mounted in the housing as claimed in claim 1, wherein a positive terminal of said appliance is constructed so that it has at least one projection associated with it which can engage an external surface of said second end wall of said housing of claim 1, so as to prevent said positive terminal of said appliance making contact with the negative terminal of a dry cell in a cavity associated with said second end wall of said housing.

19. The appliance as claimed in claim 18, wherein said at least one projection is configured to engage an external surface of said first end wall so as to prevent said positive terminal of said appliance making contact with the negative terminal of an incorrectly positioned dry cell in a dry cell cavity associated with said first end wall of said housing.

20. A housing being insertable into, and removable from, an appliance, said housing holding at least two dry cells in an in-line or end to end orientation, said housing comprising a series of dry cell cavities to receive said dry cells, said cavities including a body portion having at least one side wall portion, a part of said body associated with each cavity having a shaped aperture therethrough which has a profile similar to a silhouette of a dry cell with a part of the aperture representing the positive end of a dry cell, said part of said aperture and said aperture being oriented so as to correspond to and indicate the correct orientation of the dry cell in said cavity, said aperture being of a size which will prevent said dry cell passing through said aperture.

21. The housing as claimed in claim 20, wherein said housing is generally cylindrical.

22. The housing as claimed in claim 20, wherein said shaped aperture cooperates with said at least one side wall portion to assist said at least one side wall portion in movement, thereby allowing removal or insertion of said dry cells out of or into said cavity.

23. The housing as claimed in claim 20, wherein said housing includes holding members to releasably hold said dry cells in said cavity.

24. The housing as claimed in claim 20, wherein said aperture assists in the removal of a dry cell from said cavity.

25. An appliance in combination with a housing of claim 1, wherein said appliance has a housing receiving cavity to receive said housing, said appliance including a positive and negative terminal for electrical connection to first and second ends of said housing, said intermediate walls of said housing having a thickness or depth of a dimension so that the overall length of said housing is greater than the length of the same number of said dry cells which said housing is meant to receive when said same number of dry cells are series connected from end to end, said housing receiving cavity being of a dimension such that if said number of dry cells are placed in said housing receiving cavity without said housing, the positive and negative terminal of said appliance are sufficiently spaced that no simultaneous electrical connection can be made between all of said dry cells and said positive and negative terminals.

26. The housing as claimed in claim 7, wherein said body includes an aperture to provide some resilient flexibility to assist said holding members in movement, thereby allowing placement and removal of said dry cells.

27. The housing as claimed in claim 26, wherein said aperture has the profile similar to the silhouette of a dry cell with a representation of a positive terminal being visible.

28. The housing as claimed in claim 9, wherein said body includes an aperture having the profile similar to the silhouette of a dry cell with a representation of a positive terminal being visible. In amendments to the claims, if the change is five or less words, use the method described above (inserting claim number instead of page number).

* * * * *